(12) United States Patent
Vandergheynst et al.

(10) Patent No.: US 6,764,618 B1
(45) Date of Patent: Jul. 20, 2004

(54) METHOD FOR MAKING MIXED OXIDE (U, PU)O₂ NUCLEAR FUEL PELLETS FROM NON-CASTABLE UO₂ POWDER

(75) Inventors: Alain Vandergheynst, Dour (BE); Jean P. van Vliet, Grimbergen (BE); Eduard Pelckmans, Kasterlee (BE)

(73) Assignee: Belgonucleaire SA, Brussels (BE)

( * ) Notice: Subject to any disclaimer, the term of this patent is extended or adjusted under 35 U.S.C. 154(b) by 0 days.

(21) Appl. No.: 09/868,859
(22) PCT Filed: Jul. 2, 1999
(86) PCT No.: PCT/BE99/00084
    § 371 (c)(1),
    (2), (4) Date: Jun. 21, 2001
(87) PCT Pub. No.: WO01/03143
    PCT Pub. Date: Jan. 11, 2001
(51) Int. Cl.⁷ .......................... G21C 21/00; B29B 17/00
(52) U.S. Cl. ........................ 264/0.5; 264/37.1; 264/37.3
(58) Field of Search .............................. 264/0.5, 37.1, 264/37.3

(56) References Cited

U.S. PATENT DOCUMENTS

| | | | | |
|---|---|---|---|---|
| 3,806,565 A | * | 4/1974 | Langrod | 264/0.5 |
| 3,930,787 A | * | 1/1976 | DeHollander et al. | 432/198 |
| 4,247,495 A | * | 1/1981 | Ennerst et al. | 264/0.5 |
| 5,841,200 A | * | 11/1998 | Bauer et al. | 264/0.5 |

* cited by examiner

Primary Examiner—Christopher A. Fiorilla
(74) Attorney, Agent, or Firm—Sughrue Mion, PLLC

(57) ABSTRACT

A process for manufacturing $(U,Pu)O_2$ mixed oxide nuclear fuel pellets. In a first blending operation, $PuO_2$ is mixed with a $UO_2$ powder and/or fuel manufacturing scrap, forming a first blend. The first blend is micronized and sieved to form a conditioned first blend. Non-free-flowing $UO_2$ is selected as a second portion of $UO_2$. The second portion of $UO_2$ is mechanically granulated to form granulated free-flowing $UO_2$. In a second blending operation, the conditioned first blend is further mixed with the granulated free-flowing $UO_2$ and possibly scrap. Lubricants and/or poreformers are added. The blend is pelletized and sintered. During granulation, the non free-flowing $UO_2$ is compressed to form tablets. The tablets are then crushed until a free-flowing crushed material has been formed. At least one portion of this free flowing crushed material is used in the second blending operation.

10 Claims, 3 Drawing Sheets

Mixed oxide fuel manufacturing process

Variant of the mechanical granulation treatment of non-flowing $UO_2$ powders

METHOD FOR MAKING MIXED OXIDE (U, PU)O$_2$ NUCLEAR FUEL PELLETS FROM NON-CASTABLE UO$_2$ POWDER

This application is a 371 of PCT/BE99/00084 filed Jul. 2, 1999.

The present invention relates to a process for manufacturing a (U,Pu)O$_2$ mixed powder from non-free-flowing UO$_2$ powders.

The manufacture of fuel for light-water reactors, based on uranium and plutonium oxides, generally called MOX fuel, has been the subject of various developments associated with the desire to recycle plutonium recovered during spent fuel reprocessing.

The manufacture and irradiation of MOX fuel in light-water reactors are now considered to be a solution for providing reasonable resistance to the proliferation of plutonium, present in a form separated from the fission products, whether this plutonium is either of civilian or military origin.

Several processes for manufacturing MOX fuel have been developed over the last two decades, some of the processes involving the complete milling of the UO$_2$ and PuO$_2$ powders in order to provide an intimate blend, while others are limited to milling only a fraction of these powders.

The MIMAS (standing for MIcronization and MASter blend) process, which was developed by the Applicant of the present invention (see FIG. 1), comprises the micronization, by milling, of only a fraction of the final blend and uses two successive blending operations to achieve isotopic homogenization and to take advantage of the use of free-flowing UO$_2$ incoming products (especially to ensure that the dies of the presses used for pelletizing are properly filled). Using free-flowing UO$_2$ powders in the second blending operation and limiting the milling to only the first blending operation simplify the manufacture (for example by dispensing with the operations of precompacting/granulating or spheroidization of the mixed oxide blend) and have greatly simplified, at the start of industrial implementation, the qualification of MOX fuel by users and the licensing process by the Nuclear Safety Authorities (thanks to the similarity in behavior between this MOX fuel and UO$_2$ fuel).

Various versions of the MIMAS process have been applied, sometimes under names different from MIMAS, but all characterized by two successive blending operations, the second of which uses free-flowing UO$_2$.

UO$_2$ which serves as feed material in the manufacture of enriched-uranium fuel and, in the great majority of cases, in the manufacture of MOX fuel, is obtained by the conversion of uranium hexafluoride. There are industrial conversion processes which produce free-flowing UO$_2$ powder. This is especially the case with two industrial conversion processes using a wet route, known in the art by the respective names "AUC", coming from the intermediate product (Ammonium Uranyl Carbonate), and "TU2", coming from the uranium transformation unit in which the conversion is carried out. One of the drawbacks of these wet conversion processes is the production of a large amount of liquid effluents which have to be treated before discharge. The wet conversion processes, some of which do not produce free-flowing UO$_2$, are gradually being replaced with dry processes which allow the gaseous effluents to be recycled but which generally produce non-free-flowing UO$_2$ powder.

For the purpose of diversifying the sources of UO$_2$ powder for manufacturing MOX fuel by MIMAS-type processes, it is therefore useful to be able to employ non-free-flowing UO$_2$ powders.

Non-free-flowing UO$_2$ powder conditioning processes, for transforming it into free-flowing UO$_2$ granules, and therefore having properties suitable for feeding a pelletizing press, are known. Various mechanical granulation processes, such as precompaction-granulation or agglomeration-spheroidization, have been developed and are used on an industrial scale in UO$_2$ fuel manufacturing plants.

Experience has shown that these granulation processes produce granules of insufficient mechanical strength for correct implementation of the second blending operation which characterizes the MIMAS processes and similar processes. Under the optimum operation of the second blender, the granules are damaged and the flowability of the secondary blend is impaired: the fuel pellets which result therefrom suffer from major defects (excessive variability in the physical properties of the product, local differential shrinkage defects, etc.). Alternatively, if the method of operating the second blender is modified so as to achieve gentle mixing of the powders to be blended, or if the apparatus used for the second blending is modified for the same purpose, the uniformity of distribution of the plutonium within the fuel may be impaired and the MOX pellets thus produced no longer meet the maximum plutonium content variability criteria.

To avoid the abovementioned drawbacks, the process for manufacturing MOX fuel from non-free-flowing UO$_2$ powder, which is the subject matter of the invention, comprises a mechanical granulation treatment of the non-free-flowing UO$_2$ powder, which does not modify the chemical properties (such as a stoichiometry) and morphological properties (such as the particle size) of the UO$_2$ powder, but which does nevertheless ensure the mechanical strength and flowability that are required to successfully carry out the second blending operation and the pelletizing operation, respectively.

The invention thus obviates the need to supply the MIMAS-type processes with free flowing UO$_2$ powders as feed materials.

According to one advantageous method of implementing the invention, non-free-flowing UO$_2$ powder is used, one part of which is used, as it is, for incorporation in the first blend and one part of which undergoes a granulation treatment before being incorporated into the second blend.

In a variant, as a nonlimiting example, said granulation treatment may also be applied to the non-free-flowing UO$_2$ fraction fed in the first blend In order to avoid the drawback of the abovementioned lack of mechanical strength of UO$_2$ granulated by one of the usual conditioning processes, the mechanical treatment according to the invention is carried out either by forcing the non-free-flowing UO$_2$ powder through a screen or sieve, or by compressing this powder into tablets under a high pressure, as required for obtaining suitable non-friability properties, and then crushing said tablets. When necessary, one or more binders and/or lubricants may be added beforehand to the UO$_2$ powder.

Further details and features of the invention will become apparent from the claims and from the description of the drawings, which are appended to the present specification and which illustrate, by way of nonlimiting examples, the manufacturing process according to the invention.

In the various figures, the same reference notations denote identical or similar components.

Figure 2:
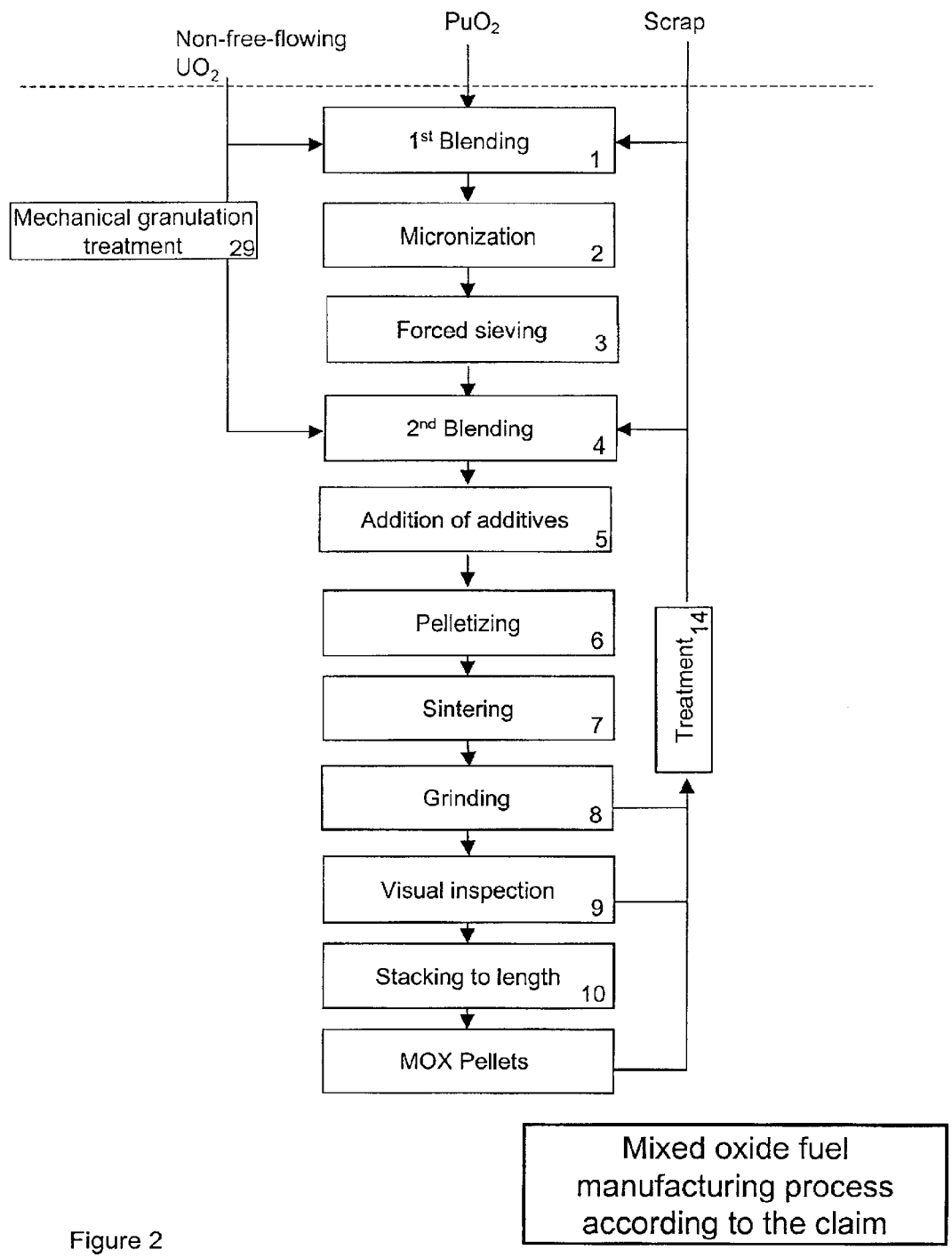
FIG. 2 shows schematically the steps in the manufacture of mixed oxide fuel according to a process of the invention.

The process of the invention, for the use of non-free-flowing $UO_2$ powder, comprises basically a process for the manufacture of $(U,Pu)O_2$ mixed oxide fuel pellets, that is to say overall (FIG. 2).

- dosing and first blending (step 1) of $PuO_2$ powders and/or $UO_2$ powders and/or fuel manufacturing scrap;
- micronization (step 2) of this first blend, particularly by milling, and forced sieving (step 3) of its product, for example through a 250 μm screen mesh;
- additional dosing and second blending (step 4) of the first blend thus treated, $UO_2$ and, where appropriate, fuel manufacturing scrap;
- addition, and blending with the resulting second blend of one or more lubricants and/or poreformers (step 5), the latter step possibly being completely or partly combined with step 4;
- compression (step 6) of the second blend into pellets using pelletizing presses; and
- sintering (step 7) of the pellets thus formed, preferably in an atmosphere of moistened argon (or nitrogen) and hydrogen.

Figure 1:
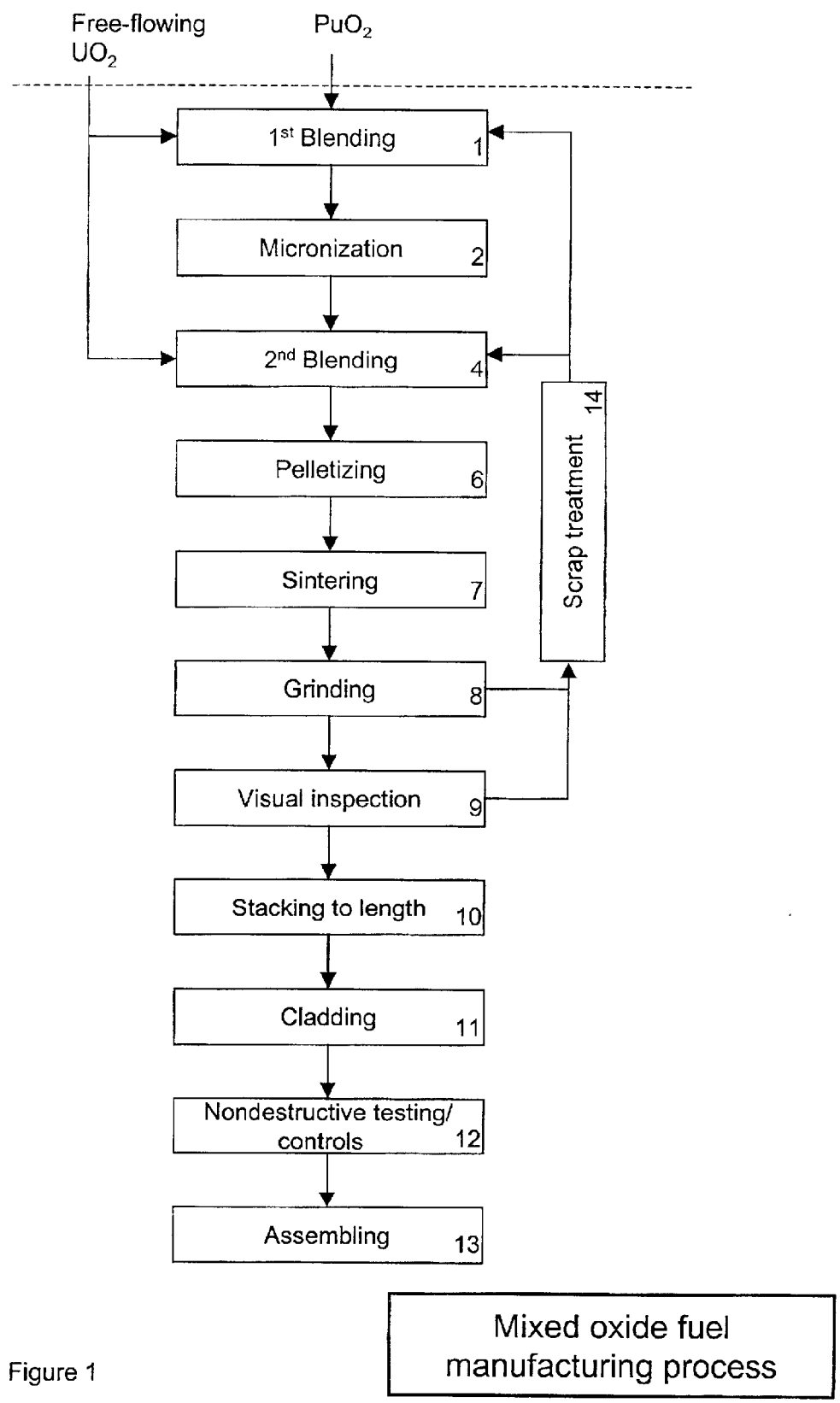
FIG. 1 shows schematically the steps in the manufacture of mixed oxide fuel according to a known process of the MIMAS type.

This mixed oxide fuel pellet manufacturing process may also usually include, for the pellets thus obtained, steps of:
- dry grinding (step 8);
- visual inspection (step 9);
- stacking up to length (step 10);
- loading the pellets into a cladding and welding the latter so as to form a fuel rod (step 11, FIG. 1);
- pressurizing the rods;
- nondestructive testing/examination of the rods (step 12); and
- assembling of the rods (step 13).

Figure 3:
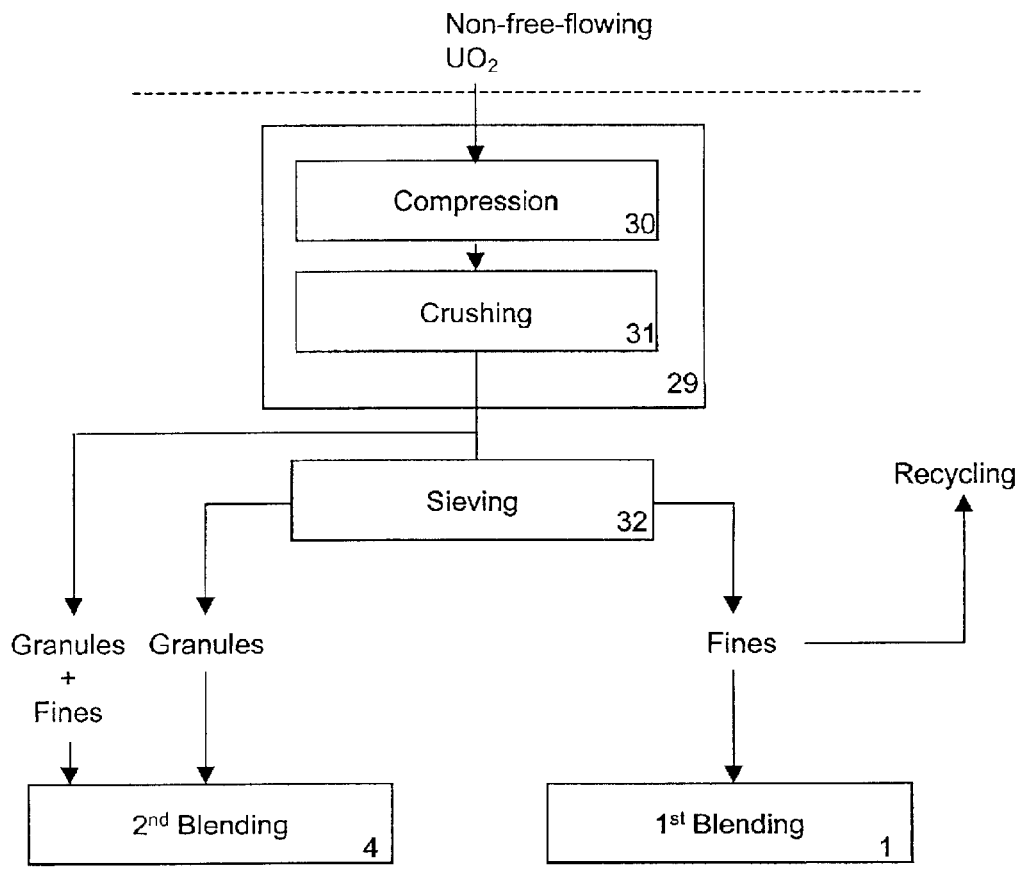
FIG. 3 shows schematically variants of the process according to the invention.

Said process of the invention furthermore includes (FIG. 2) a prior mechanical granulation treatment of all or part of the nonflowing $UO_2$ (step 29). This treatment may comprise, for example:

- either (FIG. 3) steps of compressing the non-free-flowing $UO_2$ into tablets (step 30) and of crushing these tablets (step 31) and, where appropriate, of sieving the crushed material (step 32) in order to form free-flowing granules having properties suitable for being incorporated as the basic constituent in the second blending operation (step 4) or, in a variant, in both blending operations (steps 1 and 4), while maintaining the original chemical composition and original particle size of the original $UO_2$;
- or an agglomeration/precompaction/granulation step by forcing the non-free-flowing $UO_2$ powder through a screen or sieve (step 29), the amount of additive (s), the mesh size of the screen or sieve and the pressure exerted on the powder being adjusted in order to form granules having the suitable properties described above.

A few nonlimiting parameters of the pellet manufacturing process are given below by way of example:
- batch/campaign operation rather than continuous operation;
- plutonium content of the first blend: 20 to 40% (step 1);
- milling (step 4) in 60 kg batches for a minimum effective time of 5 hours;
- use of non-free-flowing $UO_2$ powders coming from a wet conversion (for example, ex-ADU or ammonium diuranate powder) or from a dry conversion (said conversions being known to those skilled in the art);
- addition of 0.2 to 0.5% of zinc stearate and 0 to 1% of an AZB pore former (known to those skilled in the art);
- pelletizing compression (step 6) at a pressure between 400 and 700 MPa;
- sintering (step 7) for at least 4 hours at a temperature between 1600 and 1760° C. in an argon atmosphere containing 5% hydrogen, with an $H_2/H_2O$ ratio of 10 to 30; and
- dry centerless grinding (step 8).

By way of nonlimiting example, the compression step (step 30) may be carried out at a pressure of between 50 and 200 MPa, this being tailored according to the characteristics of the non-free-flowing powder. These pressures are therefore higher than the granulation pressures (4 to 10 MPa) generally used in $UO_2$ nuclear fuel manufacturing plants. Some binder and/or lubricant, both well known to those skilled in the art, may be incorporated into the non-free-flowing $UO_2$ powder before compression: by way of nonlimiting example, the compression may thus be carried out at a pressure of between 40 and 100 MPa.

Also by way of nonlimiting example, the aforementioned tablets may be crushed in one or more jaw crushes or roll mills of 200–250 μm aperture. This crushing may be followed by sieving it the crusher lets through, or runs the risk of letting through, granules having a size greater than 250 μm. The fines possibly resulting from the crushing may usefully be incorporated as raw material into the first blending operation (step 1).

By way of yet another nonlimiting example, the operation of forcing the powder through a sieve (step 29) may be carried out in a machine of the kind used in MIMAS-type processes (step 3) to fill the first blend (after the micronization of step 2) before the second blending (step 4). Such machines, which combine agglomeration/precompaction upstream of the sieve and control of the maximum granule size by passing the powder through this same sieve, may produce granules of the desired characteristics directly.

Experience has shown the Applicant that a non-free-flowing powder treated according to the processs forming the subject matter of the invention can be used in existing MOX manufacturing plants, by passing the parameters of this second blending operation (step 4), the pelletizing (step 6) and the sintering (step 7), within the adjustment limits routinely used to optimize the manufacturing process according to the characteristics of the various free-flowing $UO_2$ powders used for MOX fuel manufacture.

The process of the invention therefore makes it possible to extend the range of $UO_2$ powders which can be used to manufacture MOX fuel, without loosing the benefit of the similarity between the MOX fuel produced according to the invention and the $UO_2$ fuel manufactured on an industrial scale by the processes known hitherto, starting from the same non-free-flowing $UO_2$ powder.

It should be understood that the present invention is in no way limited to the methods of implementation described above and that many modifications may be made thereto without departing from the scope of the claims given hereafter.

The non-free-flowing $UO_2$ conditioning process may especially be applied to $UO_2$ coming from a conversion other than the conversion of uranium hexafluoride into $UO_2$.

What is claimed is:

1. A process for manufacturing $(U,Pu)O_2$ mixed oxide nuclear fuel pellets,
   comprising the steps of:

dosing and first blending (1) $PuO_2$ with a first portion of $UO_2$ powders and/or fuel manufacturing scrap, to form a first blend;

micronizing (2) and forced sieving (3) the first blend, to form a conditioned first blend;

selecting non-free-flowing $UO_2$ as a second portion of $UO_2$;

mechanically granulating (29) the second portion of $UO_2$ so as to form granulated free-flowing $UO_2$, additionally dosing and second blending (4) the conditioned first blend, the granulated free-flowing $UO_2$ and possibly scrap;

adding and blending lubricants and/or poreformers (5), separately or in combination with the second blending step (4);

pelletizing (6) the second blend; and sintering (7) the pellets thus formed, wherein said granulating step further comprises the steps of:

compressing (30) non free-flowing $UO_2$ to form tablets;

crushing (31) the tablets, until a free-flowing crushed material has been formed; and using at least one portion of this free-flowing crushed material for said second blending operation (4).

2. The process as claimed in claim 1, further comprising the step of carrying out the compressing step at a pressure of between 40 and 200 MPa.

3. The process as claimed in claim 1, characterized in that a jaw crusher or a roll mill is used for the crushing step (31).

4. The process as claimed in claim 1, characterized in that it furthermore comprises particle size selection by sieving (32) of the granulated $UO_2$ before it is used.

5. The process as claimed in claim 4, characterized in that the granulated $UO_2$ is separated, by the sieving (32), into at least two fractions of different particle sizes, the finest fraction possibly being introduced into the aforementioned first blending operation (1) whereas the other fraction is incorporated into the second blending operation (4).

6. The process as claimed in claim 1, characterized in that it comprises, in order to carry out said granulation of the non-free-flowing $UO_2$, an operation to force the latter through a screen or sieve, the amount of additive(s), the mesh size of the screen or sieve and the pressure exerted on the powder all being adjusted so as to form granules having the appropriate properties.

7. The process as claimed in claim 1, characterized in that, for said granulation of the non-free-flowing $UO_2$, a lubricant is added to it.

8. The process as claimed in claim 1, characterized in that, for said granulation of the non-free-flowing $UO_2$, a binder is added to it.

9. The process as claimed in claim 1, characterized in that the sintering (7) of the fuel pellets in an atmosphere of argon and hydrogen is carried out at a temperature between 1600 and 1760° C., the argon possibly being replaced with nitrogen.

10. The process as claimed in claim 1, characterized in that, during the sintering (7), the oxygen partial pressure is adjusted, preferably by adjusting the $H_2/H_2O$ ratio in the flushing gas, in order to improve the interdiffusion of the $PuO_2$ and $UO_2$ oxides.

* * * * *